3,457,187
HYDROGENATION CATALYST
Robert K. Armstrong, Glassboro, N.J., and Richard L. von Trebra, Jr., Mequon, Wis., assignors to E. I. du Pont de Nemours and Company, Wilmington, Del., a corporation of Delaware
No Drawing. Filed Apr. 28, 1966, Ser. No. 545,853
Int. Cl. B01j 11/16; C07c 131/00
U.S. Cl. 252—430                                11 Claims

ABSTRACT OF THE DISCLOSURE

Making a hydrogenation catalyst for reducing secondary nitro alkanes and nitro cycloalkanes to the corresponding ketoximes by wetting carbon with an aqueous solution of a palladium salt and precipitating palladium hydroxide on said carbon, wetting the palladium hydroxide-on-carbon with an aqueous solution of a lead salt and adding a compound capable of supplying anions in solution which precipitate a water-insoluble lead compound on the carbon. The water-insoluble lead compound includes compounds such as the oxalate, sulfate, carbonate and hydroxide.

---

The present invention relates to a method for preparing an improved hydrogenation catalyst selective for reducing secondary nitro alkanes and nitro cycloalkanes to the corresponding ketoximes.

Ketoximes, especially cyclohexanone oxime, are important chemical intermediates, for example, in the preparation of amides and cyclic amides (lactams). Cyclohexanone oxime, especially, has found widespread use in the preparation of ε-caprolactam, a valuable monomer used to make polyamide fibers, plastics, and resins.

One method of synthesizing ketoximes consists in catalytically hydrogenating secondary nitro alkanes and nitro-cycloalkanes. Reactions of this type can result, however, in the formation of substantial amounts of by-products such as dialkyl and cycloalkyl hydroxylamines, amines, and ketones, unless specific measures are taken to produce a reaction system which is selective for ketoxime formattiton. A process providing such selectivity is described in U.S. Patent 2,967,200. This process involves contacting the secondary nitro alkane or nitro cycloalkane with hydrogen in the presence of a hydrogenation catalyst, e.g., a palladium or platinum catalyst, and lead or a lead compound. The presence of lead is necessary for the selection formation of the ketoxime, as described in the aforesaid patent and such process results in a pronounced improvement in oxime yield and by-product suppression as contrasted to the results obtained in the absence of lead. The need exists, however, for a process that provides still greater selectivity for ketoxime formation when the aforementioned nitro compounds are hydrogenated.

It now has been found that a higher ketoxime yield can be achieved in a process for catalytically hydrogenating secondary nitro alkanes and nitro cycloalkanes selectively to the corresponding ketoximes in lead-containing reaction systems, such as the process described in U.S. Patent 2,967,200, when the hydrogenation catalyst is prepared by depositing palladium and lead compounds on a carbon support in a specific manner and prior to introducing the catalyst into the hydrogenation reaction system. Quite surprisingly, it has been found that a hydrogenation catalyst exhibiting improved selectivity for reducing nitro compounds to ketoximes is prepared by (1) wetting carbon, e.g., oleophilic carbon, with an aqueous solution of a palladium salt, (2) contacting the wetter carbon with an aqueous solution of an alkali metal bicarbonate to precipitate palladium hydroxide on said carbon, (3) subsequently wetting the resulting palladium-on-carbon with an aqueous solution of a lead salt, and (4) contacting the wetted palladium-on-carbon with a compound capable of supplying anions in solution which precipitate a water-insoluble lead compound on said carbon.

This invention requires that the palladium must be precipitated on carbon in compound form and not present as elemental palladium. Furthermore, the palladium compound on carbon, subsequently treated with an aqueous solution of a lead salt must be further treated so as to precipitate an insoluble lead compound, e.g., lead sulfate, on the carbon. In order to obtain the results shown in the examples the lead, initially adsorbed on the carbon containing the palladium catalyst, must be precipitated on said carbon by the addition of a compound capable of supplying an anion which forms an insoluble lead compound. Precipitating lead on the catalyst support in this manner, as contrasted to introducing lead or a lead compound directly into the hydrogenation reaction system, merely adsorbing a lead compound on the catalyst, or other alternative means of application to the catalyst support, produces a hydrogenation system giving increased selectivity, annd thus higher yields, when secondary nitro alkanes and nitro cycloalkanes are reduced to the corresponding ketoximes.

The catalyst support material is carbon. Oleophilic carbons, described, for example, in U.S. Patent 2,823,235, are highly desirable support materials for the hydrogenation catalyst of the present invention because their large oil absorption factors lead to a better reaction rate and reactant consumption. A preferred oleophilic carbon support for the catalyst for use in the invention is acetylene black, sold commercially as Shawinigan acetylene black, and described more fully in the above-mentioned patent.

The palladium is applied to the carbon support by wetting the carbon with an aqueous solution of a palladium salt and incorporating an alkali metal bicarbonate under conditions such that palladium hydroxide precipitates on the carbon. Usually it is better first to suspend the carbon in water to assure complete wetting, and, if desired, an organic wetting agent such as acetone can be used to facilitate wetting the carbon. Then the suspension is admixed with an aqueous palladium salt solution, e.g., a solution of palladium chloride, palladium sulfate, palladous sodium chloride, or palladous potassium chloride, followed by precipitation of palladium hydroxide on the support. The latter is precipitated on the carbon support by the addition of an aqueous solution of alkali metal bicarbonate, e.g., sodium bicarbonate, to the suspension prior to, at the same time, or after the addition of the palladium salt solution, followed by heating to about 75–100° C., and holding at such temperature until a test portion, when filtered, no longer shows a positive test for palladous ion. A large excess of bicarbonate generally is used to assure good control of the catalyst system. Preferably, the weight ratio of alkali metal bicarbonate to palladium is from about 15 to 75. The concentration of the palladium salt solution is such that the loading of palladium (calculated as metal) is from about 0.5 to 10%, and preferably about 5%, based on the weight of carbon support.

For precipitating a lead compound on the catalyst support, the solids, i.e., palladium-on-carbon support, are first wetted with an aqueous lead salt solution. It should be mentioned that for better control of the catalyst preparation, the solids are separated from the liquor after the palladium compound is precipitated on the carbon, e.g., by filtration, and washed. The solids can then be suspended in the lead salt solution, or suspended in water and the suspension and solution combined together. In any event, any water-soluble lead salt can be used in the process, e.g., lead acetate, lead subacetate, lead formate, lead nitrate, lead citrate, and lead chlorate. When the water-soluble lead salt is contacted with the palladium-on-carbon, lead is adsorbed on the carbon. However, mere adsorption of lead on the carbon is not sufficient and does not produce an improved catalyst. It is necessary to precipitate a lead compound on the catalyst support, and this is done before the material is added to the hydrogenation system, by adding to the suspension a compound which supplies an anion in solution which forms an insoluble compound with lead. Precipitating agents that supply anions that can be added to the palladium-on-carbon to precipitate lead are, for example, sodium, potassium, and lithium sulfate, carbonate, bicarbonate, oxalate, and hydroxide, and carbon dioxide. The insoluble lead compound that is precipitated on the carbon can be any compound except, of course, those which act as poisons in the hydrogenation system, e.g., sulfide and chromate. On the basis of availability and economy, the water-soluble alkali metal sulfates, carbonates, bicarbonates, oxalates, and hydroxides are preferred lead-precipitating compounds. The precipitation can be best effected by admixing the suspension of palladium-on-carbon containing lead with a solution containing the required anions, or by bubbling a gas, such as carbon dioxide, through the suspension.

The amount of lead compound precipitated on the catalyst can vary widely. Usually the weight ratio of lead to palladium is at least about 1, a ratio of at least about 5 being preferred. As the following examples show, higher lead-to-palladium ratios can be employed without deleterious effect on selectivity. However, as the ratio becomes higher, e.g., about 15, the reaction rate becomes lower.

The amount of catalyst used in processes involving hydrogenation of nitro compounds to ketoximes depends on a number of reaction variables. Generally amounts are such as to provide at least one part of palladium per million parts of nitro compound. However, a catalyst concencentration of about 500 parts of palladium per million parts of nitro compound is preferred in order to decrease the reaction time. If desired, promoters, e.g., magnesium compounds can be added to the catalyst to increase the reaction rate.

The hydrogenation processes in which the catalyst of the present invention are used, can be carried out at temperatures within the range of from about 60° C. to the decomposition temperature of the secondary nitro alkane or nitro cycloalkane. The use of lower temperatures is impractical because of the greatly increased reaction time thereby required, whereas the use of higher temperatures causes decomposition and resultant yield losses. Temperatures within the range of 100° C. to 200° C. are especially effective.

In effecting the hydrogenation using the catalyst of the present invention, pressures ranging from atmospheric to the maximum permitted by the mechanical limitations of the available equipment can be employed, e.g., 1–1000 atmospheres. Although entirely satisfactory yields of oximes can be obtained when atmospheric pressure is used, the use of higher pressures is advantageous because the reaction rate is thereby increased.

The use of the catalyst prepared by the present process is illustrated hereinbelow by the hydrogenation of nitrocyclohexane to cyclohexanone oxime. Equally feasible, however, is the production of other ketoximes from the corresponding nitro cycloalkanes having from about 5 to 12 carbon atoms, e.g., cyclopentanone oxime from nitrocyclopentane and cycloheptanone oxime from nitrocycloheptane; and from the corresponding secondary nitro alkanes having from about 3 to 10 carbon atoms, e.g., acetone oxime from 2-nitropropane and butanone oxime from 2-nitrobutane.

The following examples serve to illustrate specific embodiments of the process of the present invention. However, they will be understood to be illustrative only and not as limiting the invention in any manner.

In each example illustrating hydrogenation, 129 grams of nitrocyclohexanone, 245 milliliters of water, and the palladium-on-carbon catalyst containing a lead compound which has been precipitated on the carbon according to the process of this inventon are charged to a stirred autoclave. The amount of catalyst charged to the autoclave is such as to provide 500 parts of palladium per million parts of nitrocyclohexane. Hydrogen is introduced under an initial pressure of 450 p.s.i.g., and the mixture is heated at 150° C. until the pressure ceases to fall. The product is cooled and removed from the autoclave, the two phases are separated, and the aqueous phase is extracted with chloroform, after which the extract is analyzed by means of a vapor-phase chromatograph.

EXAMPLE 1

Acetylene black (162.5 grams), 3900 milliliters of water, and 13 milliliters of acetone are stirred together until all of the carbon has been wet, after which 1300 milliliters of a solution of palladium chloride (8.125 grams palladium) in aqueous sodium chloride (palladous sodium chloride) is added. The mixture is stirred for 10 minutes, and a solution of 585 grams of sodium bicarbonate in 3900 milliliters of water is added. The mixture is heated at 90° C. for 45 minutes, cooled, filtered, and the filter cake washed by sucking six liters of water through the cake, not allowing the cake to dry.

(A) A portion (71.4 grams; 0.625 gram of palladium) of the filter cake is suspended in 500 milliliters of water (pH=7.5), and a solution of 8.59 grams of lead acetate trihydrate in 250 milliliters of water is added to the suspension (pH=6.0). A solution of 21.3 grams of sodium sulfate in 250 milliliters of water is added over a period of 15 minutes (pH=6.4), thereby precipitating lead sulfate on the catalyst. The pH is brought up to 9.5, and the mixture stirred for 15 minutes (pH=8.9), filtered, and the filter cake washed twice with 200 milliliters of water.

When this catalyst is used in the reduction of nitrocyclohexane as described in the hydrogenation procedure above, the reaction is completed in 44 minutes as evidenced by the cessation of pressure drop. The product contains (by weight) 84.2% cyclohexanone oxime, 6.4% cyclohexylamine, 3.2% cyclohexylhydroxylamine, and 1.3% cyclohexanone.

By contrast, experiments B and C hereinbelow are conducted substantially according to the procedure described above with the omission of the precipitation of lead sulfate on the catalyst support by addition of sodium sulfate.

(B) Another 71.4 gram portion of the filter cake is suspended in 700 milliliters of water (pH=7.5), a solution of 7.14 grams of lead acetate trihydrate in 70 milliliters of water is added to the suspension, and the mixture stirred for 10 minutes (pH=6.0). The mixture then is heated at 95° C. for 40 minutes, cooled to 50° C. (pH=6.0), and washed with 2800 milliliters of water.

In the reduction of nitrocyclohexane as described above in the hydrogenation procedure this catalyst gives, in 22 minutes, a product containing only 77.8% cyclohexanone oxime, 9.7% cyclohexylamine, 7.9% cyclohexylhydroxylamine, and 1.2% cyclohexanone.

(C) Another 71.4 gram portion of the filter cake of a palladium-on-acetylene black, prepared as described above, is charged to the hydrogenation autoclave together with lead acetate trihydrate in an amount such as to provide a lead-to-palladium gram-atom ratio of 5.

Hydrogenation of nitrocyclohexane as described above in this system gives only 78.2% cyclohexanone oxime, 11.4% cyclohexylamine, 9.8% cyclohexylhydroxylamine, and 1.5% cyclohexanone.

EXAMPLE 2

Palladium hydroxide is deposited on acetylene black as described in Example 1, with the exception that in the washing procedure, the filter cake is washed 4 times with 1500-milliliter portions of water, the first time by suspending the dry filter cake, and subsequently by sucking the water through the wet filter cake.

A portion (82.7 grams; 0.625 gram of palladium) of the filter cake is suspended in 500 milliliters of water (pH=9.1), and 100 milliliters of a solution of 57.25 grams of lead acetate trihydrate and 27.6 grams of magnesium acetate tetrahydrate in one liter of water (3.13 grams of lead and 0.313 grams of magnesium in 100 milliliters of solution) is added to the suspension (pH=6.0). The pH is brought up to 8.5, and a solution of 13.4 grams of sodium oxalate in 600 milliliters of water is added over a period of 15 minutes (pH=9.65), thereby precipitating lead oxalate on the catalyst. The mixture is filtered, and the filter cake washed twice with 200 milliliters of water.

When this catalyst is used in the hydrogenation procedure described above, the process yields in 28 minutes, 88.35% cyclohexanone oxime, 5.69% cyclohexylamine, 3.71% cyclohexylhydroxylamine, and 1.58% cyclohexanone.

When the catalyst used in the hydrogenation procedure described above, is prepared in the same manner but without the addition of a magnesium compound and with the addition of a solution of 8.59 grams of lead acetate trihydrate in 100 milliliters of water to the suspension and thereafter a solution of 20.1 grams of sodium oxalate in 750 milliliters of water over a period of 30 minutes, the reaction is completed in 43 minutes, giving 88.3% oxime, 5.77% amine, 3.16% cyclohexylhydroxylamine, and 2.52% ketone.

EXAMPLE 3

A portion (64.5 grams; 0.625 gram of palladium) of a filter cake obtained by depositing palladium hydroxide on acetylene black according to the procedure described in Example 1 is suspended in 300 milliliters of water, and a solution of 5.725 grams of lead acetate trihydrate and 2.76 grams of magnesium acetate tetrahydrate in 100 milliliters of water is added. The pH is brought up to 8.5, and a solution of 31 grams of sodium bicarbonate in 100 milliliters of water is added, thereby precipitating lead carbonate on the catalyst. The mixture is heated to 70° C., cooled, and filtered.

In the hydrogenation procedure described above this catalyst gives, in 40 minutes, 86.7% oxime, 6.4% amine, 3.8% cyclohexylhydroxylamine, and 1.8% ketone.

EXAMPLE 4

A portion (64.5 grams) of the filter cake employed in Example 3 is suspended in 500 milliliters of water and treated with a solution of lead acetate and magnesium acetate as described in Example 3. The pH is brought up to 9, and carbon dioxide is bubbled through the suspension for less than about 5 minutes (pH=7). Then the catalyst is filtered.

In the hydrogenation procedure described above, this catalyst gives, after 34 minutes, 87.7% oxime, 5.3% amine, and 2.5% ketone.

EXAMPLE 5

The procedure of Example 1A is repeated to prepare a catalyst in which lead sulfate is precipitated on the palladium-on-carbon. In this case, however, the concentrations of the solutions used are such that the lead-to-palladium weight ratio is theoretically 15.

In the hydrogenation procedure described above, this catalyst gives, in 103 minutes, 86.5% oxime, 1.68% amine, 1.47% cyclohexylhydroxylamine, and 4.87% ketone.

The following examples show the improved oxime yields obtainable by use of the catalyst prepared by the process of this invention in conjunction with the hydrogenation process described in copending application Ser. No. 539,330, filed Apr. 1, 1966, according to which an alkali metal hydroxide and/or a tetra-lower-alkyl-substituted ammonium hydroxide is added to the hydrogenation system.

EXAMPLE 6

The catalyst is prepared as follows: Acetylene black (12.5 grams), a solution of 1.09 grams of magnesium acetate tetrahydrate in 50 milliliters of water, and 800 milliliters of water are blended together and the pH brought up to 11 with 0.1 N potassium hydroxide. A solution of 45 grams of sodium bicarbonate in 375 milliliters of water is added to the suspension, followed by 100 milliliters of a solution of palladium chloride (0.625 gram of palladium) in aqueous sodium chloride. The mixture is heated at 95° C. for 40 minutes, cooled, filtered, and washed with water. Lead acetate trihydrate (5.725 grams) in 375 milliliters of water is added to a suspension of the filter cake in 500 milliliters of water. The pH is brought up to 10 with 0.1 N potassium hydroxide solution (lead hydroxide precipitates), and the mixture is cooled, filtered, and washed with 500 milliliters of $10^{-4}$ N potassium hydroxide solution.

When this catalyst is used in the hydrogenation reaction described above modified by adding an aqueous potassium hydroxide solution to the aqueous phase in the autoclave in an amount such that potassium hydroxide constitutes 0.4% of the aqueous phase (0.0175 mole), 89.0% oxime, 6.3% amine, and 6.0% ketone are obtained in 29 minutes.

EXAMPLES 7–9

In these experiments, three different catalysts prepared according to the process of the present invention wherein palladium and lead are precipitated on carbon are used in hydrogenation systems both with (Series A) and without (Series B) the addition of 0.4% potassium hydroxide to the aqueous phase. The results are shown in the following table.

| Example No. | Catalyst prepns | | Products | | | | Reaction time (min.) |
|---|---|---|---|---|---|---|---|
| | Pd deposition | Pb deposition | Oxime | Amine | CHHA | Ketone | |
| 7A | As in Ex. 2 | As in Ex. 1A (sulfate) | 92.1 | 4.3 | 0 | 6.1 | 60 |
| 7B | | | 85.4 | 6.4 | 4.8 | 1.5 | 23 |
| 8A | As in Ex. 3 | As in Ex. 3 (carbonate) | 89.3 | 4.4 | 0 | 4.9 | 35 |
| 8B | | | 84.2 | 6.3 | 4.6 | 1.5 | 28 |
| 9A | As in Ex. 2 | As in Ex. 2 (oxalate) | 38.5 | 4.8 | 0 | 3.9 | 45 |
| 9B | | | 84.8 | 6.8 | 7.4 | 1.3 | 26 |

CHHA=cyclohexylhydroxylamine.

We claim:
1. A process for preparing a hydrogenation catalyst for reducing secondary nitro alkanes and nitro cycloalkanes to the corresponding ketoximes which comprises:
   (a) wetting carbon with an aqueous solution of a palladium salt,
   (b) contacting the wetted carbon with an aqueous solution of an alkali metal bicarbonate to precipitate palladium hydroxide on said carbon,
   (c) subsequently wetting the resulting palladium-hydroxide-on-carbon with an aqueous solution of a lead salt, and
   (d) contacting the wetted palladium-hydroxide-on-carbon with a compound capable of supplying anions in solution which precipitate a water-insoluble lead compound on said carbon.

2. A process according to claim 1 wherein the compound capable of supplying anions to precipitate a lead compound is a water-soluble salt.

3. A process according to claim 1 wherein the compound capable of supplying anions to precipitate a lead compound is an alkali metal sulfate.

4. A process according to claim 1 wherein the compound capable of supplying anions to precipitate a lead compound is an alkali metal oxalate.

5. A process according to claim 1 wherein the compound capable of supplying anions to precipitate a lead compound is an alkali metal bicarbonate.

6. A process according to claim 1 wherein the compound capable of supplying anions to precipitate a lead compound is an alkali metal hydroxide.

7. A process according to claim 1 wherein the compound capable of supplying anions to precipitate a lead compound is carbon dioxide.

8. A process according to claim 1 wherein the ratio of lead to palladium on the carbon is from about 1 to 15.

9. A process according to claim 1 wherein the water-soluble lead salt is lead acetate.

10. A process according to claim 1 with the additional step of adding a magnesium compound to the palladium-hydroxide-on-carbon.

11. A process according to claim 1 wherein the carbon is oleophilic carbon.

References Cited

UNITED STATES PATENTS

| | | | |
|---|---|---|---|
| 2,857,337 | 10/1958 | Hamilton | 252—472 |
| 2,681,938 | 6/1954 | Lindlar | 260—611 |
| 2,967,200 | 1/1961 | Foster | 260—566 |

PATRICK P. GARVIN, Primary Examiner

U.S. Cl. X.R.

252—440, 443, 447; 260—566